United States Patent [19]
Strang

[11] 3,911,242
[45] Oct. 7, 1975

[54] ANTI-SMOG ELECTRICAL WELDING APPARATUS AND MULTIPLE ENERGY SUPPLY CONDUIT

[76] Inventor: Virgil G. Strang, P.O. Box 772, Renton, Wash. 98055

[22] Filed: Mar. 8, 1974

[21] Appl. No.: 449,378

Related U.S. Application Data

[63] Continuation of Ser. No. 73,367, Sept. 18, 1970, abandoned.

[52] U.S. Cl. .................................. 219/130; 219/74
[51] Int. Cl. .............................................. B23k 9/00
[58] Field of Search .......... 219/130, 136, 137, 139, 219/74, 75, 76, 70, 138, 144

[56] References Cited
UNITED STATES PATENTS

| | | | |
|---|---|---|---|
| 2,129,899 | 9/1938 | Young | 219/70 |
| 2,751,482 | 6/1956 | Stepath | 219/70 |
| 2,768,278 | 10/1956 | Gaines | 219/74 |
| 3,012,131 | 12/1961 | Forney | 219/139 |
| 3,038,059 | 6/1962 | Hinrichs | 219/130 |
| 3,151,232 | 9/1964 | Stonecipher | 219/139 |
| 3,230,343 | 1/1966 | Nagy | 219/130 X |
| 3,281,571 | 10/1966 | Gilmore | 219/130 |
| 3,387,111 | 6/1968 | Driscoll | 219/75 X |
| 3,524,956 | 8/1970 | Rocklin | 219/76 |
| 3,651,302 | 3/1972 | Maddison | 219/70 |

*Primary Examiner*—J. V. Truhe
*Assistant Examiner*—G. R. Peterson
*Attorney, Agent, or Firm*—Zarley, McKee, Thomte & Voorhees

[57] ABSTRACT

A welding apparatus and supply conduit having an electrode and electrical conduit respectively, each being surrounded by and sharing uninterruptedly the same pressurized open air channel. A compression spring is mounted in the welding apparatus open channel and a. provides a force for moving the electrode sleeve containing the electrode in a predetermined required position, b. forms an interconnecting channel to each open channel about the electrode and electrical conduit and c. consequently prevents overheating of the electrical interconnection by the cooling action of fluids passing therethrough either for supply of gas one way or removal of smog and/or contaminants the other way, which removal improves effervescence for obtaining a high quality weld.

14 Claims, 10 Drawing Figures

INVENTOR.

BY VIRGIL G. STRANG

AGENT

INVENTOR.
BY VIRGIL G. STRANG
AGENT

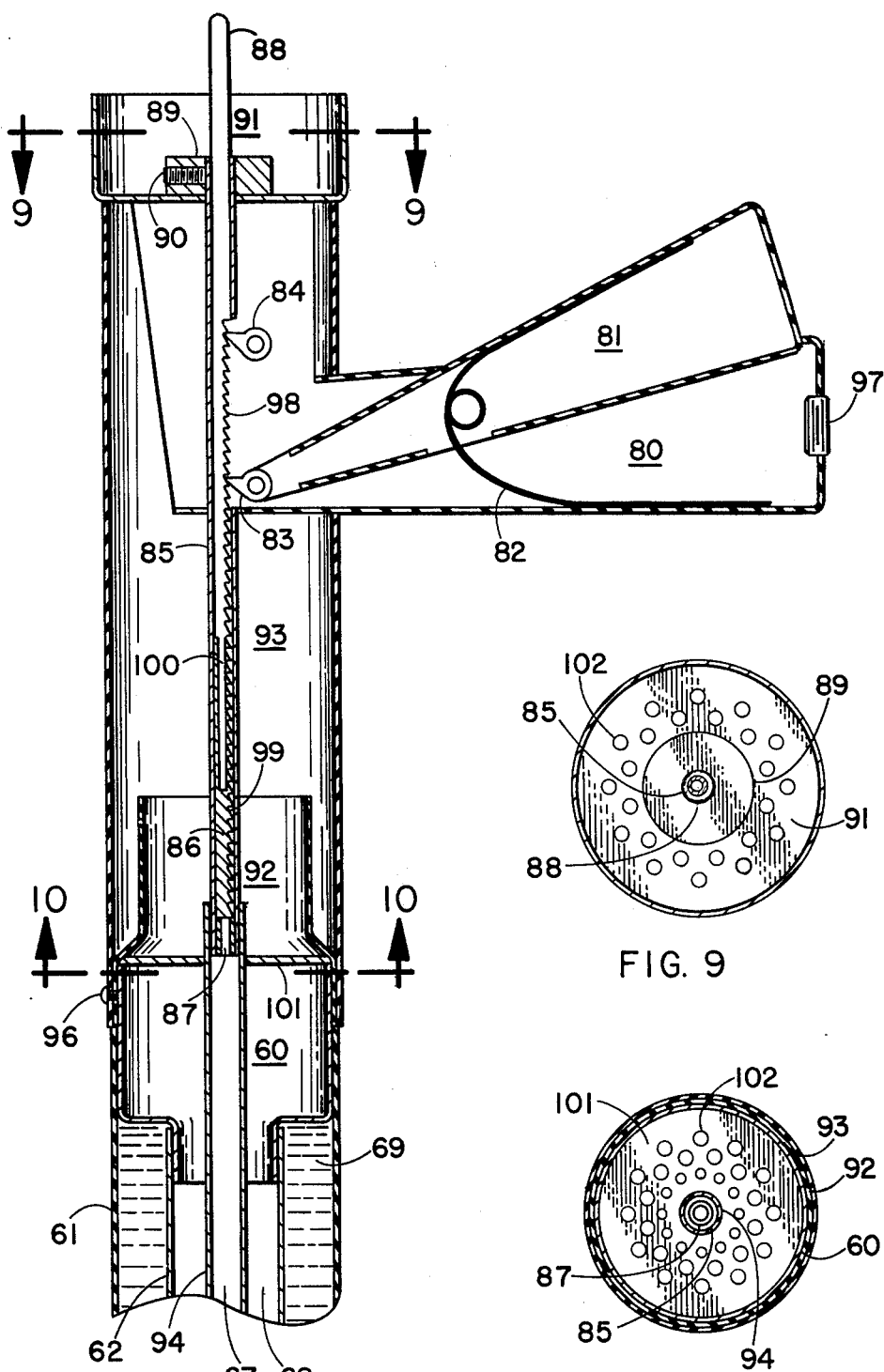

ANTI-SMOG ELECTRICAL WELDING APPARATUS AND MULTIPLE ENERGY SUPPLY CONDUIT

CROSS REFERENCE

This application is a continuation application of Ser. No. 73,367 by Virgil G. Strang, filed Sept. 18, 1970, and entitled Anti-Smog Electrical Welding Apparatus and Multiple Energy Supply Conduit now abandoned.

BACKGROUND OF THE INVENTION

1. Field of the Invention

This invention relates to the welding art and in particular to the improved construction of a welding apparatus and its supply cable for achieving high quality welds while simultaneously creating a non-polluted, safe and healthful environmental condition.

2. Description of the Prior Art

There are many concepts patented in the prior art which accomplish improvements in the welding rod holder or the supply conduit. However, none of these improvements are well received in the industry for reasons of manufacturing expense, complicated construction, and their awkward use in welding operation. Furthermore, the improvements claimed do not altogether materialize and in many instances induce unforeseen problems which diminish the expected advantages.

For instance, U.S. Pat. No. 1,749,765, by HENDRICKSON and U.S. Pat. No. 2,768,278, by GAINES, reveal welding apparatus having a large cumbersome enclosure for gas supply and smoke removal. However, the device is bulky, offers no sight for the welder and appears to have a limited use, such as for large welding operations on assembly line heavy welding construction.

The supply cable construction which is disclosed in the U.S. Pat. No. 2,416,561, by ALBIN has an air cooling feature whereby the air travels through the center-core of the cable. Cooling of the cable is only in the center and little cooling is achieved along the radius taken from the center of the electrical conductor towards the outside.

In the U.S. Pat. No. 2,797,205, by WRIFORD the supply conduit is cooled by a liquid which flows through the conduit in two directions. This system is very efficient but requires an absolutely waterproof cable as well as the necessary provision for a pressurized liquid source. Thus, the manufacturing expenses for a cable with only a cooling feature as available in the prior art without a smoke filtering and/or removing feature make these inventions less valuable for many applications.

It appears clearly that many types of welding apparatus and a few welding supply conduits or cables with cooling features could be found in the prior art which, however, do not offer the many features and advantages of the present invention.

It is therefore believed that the present hereinafter disclosed welding apparatus which has been designed, researched and tested until found to perform successfully, is superior to conventional available welding apparatus. Also, the structure is simple and manufacturing can be very economical so that this welding apparatus can be available not only to the industry, but also to the public.

The welding apparatus is light in weight and the handling of the apparatus is comparable to a soldering gun or the like. However, regardless of the economic benefits and the potential uses for many applications, the main object of the present invention is to provide for a welding apparatus which prevents smoke and gases from polluting the surroundings. As far as the weld is concerned, the present invention has proven to produce a better weld than most conventional welding apparatus, as will be explained hereinafter.

The inventor has had practical experience in the metallurigical field for several years. As a welder he suffered lung congestion or welder's cough due to the uncontrolled presence of the smoke and gases. He has concluded that his new welding apparatus has also a direct improvement upon the frame of mind; a welder who knows that his health is not in jeopardy while welding will produce a better weld with a higher production rate accomplished.

It should be stressed that conventional welding creates an enormous cloud of dirty smoke and gases which fact is not known to everyone, but only to people having experience in the welding art. This smoke problem is a very serious health hazard and the improvement of this invention is therefore very valuable on the earth as well as for outer space uses. Because of the lesser weight factor and diversified utility of this invention, and because of the filtering process, it can be employed for outer space assembly projects without contaminating the atmosphere, if any. This improved ecology created by the removal of the foul smoke, gases, and particles keeps the weld clean and, consequently, produces a stronger bond.

SUMMARY OF THE INVENTION

The present invention relates to a welding apparatus and supply conduit and more particularly to an anti-smog welding apparatus and multiple energy supply conduit. The novelty is in the construction of the apparatus and conduit so that they supplement each other in order to obtain the desired results and advantages described hereinbefore.

The apparatus is a light tube carrying a conventional welding rod by a unique adjustable mechanism hook-up by a spring which acts as a biased force, and as a temperature reducer. The conduit, which is a supplying as well as a removing component, supplements the spring structure in its direct connection therewith and also is provided with cooling features. Its construction is flexible and light and has connecting components to a welding console of the type disclosed in U.S. Pat. No. 3,514,567.

Therefore, the primary object of the present invention is to provide for a welding apparatus and conduit with anti-smog and contamination removal features. In addition, it is an object of the present invention to improve and simplify welding apparatus mechanical features as well as its resulting product of a better quality weld through efferescence.

With these objects in view, further objects and advantages will become apparent from the following detailed description and operation of the invention read in conjunction with the following drawings, wherein:

FIG. 8 is a longitudinal cross-section of a welding apparatus being the fourth embodiment of the present invention.

FIG. 9 is a cross-section taken from FIG. 8 along line 9 — 9.

FIG. 10 is a cross-section taken from FIG. 8 along line 10 — 10.

DESCRIPTION AND OPERATION OF THE INVENTION

Figure 1:
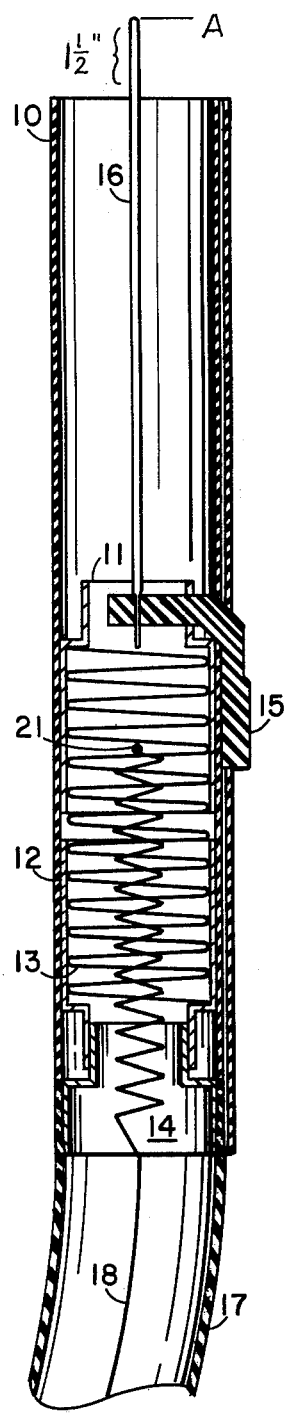
FIG. 1 is a longitudinal cross-section of a welding apparatus and thereon attached conduit means.

The present invention comprises a welding apparatus and its associated conduit. In the drawings various preferred constructions and configurations are illustrated. However, the welding apparatus and conduit disclosed and described hereinafter may be used with the patented invention mentioned hereinbefore as U.S. Pat. No. 3,514,567 entitled, "Welding Equipment," which relates to a welding system incorporating a console. This console is provided with means for supplying gases and for providing a suction force. It is recommended that the present invention be read and understood in coordination with the teachings shown and described in U.S. Pat. No. 3,514,567.

Referring now to FIG. 1 there is shown a cross-section of a welding apparatus and a thereon connected conduit 17. The holder or tube 10 contains a slidably positioned sleeve 11 and a stationary sleeve 12, each provided with shoulders so that a hollow spring 13 is retained between both sleeves 11 and 12 respectively. A sleeve 14 mates with sleeve 13 and sleeve 14 is part of the conduit 17 so that a proper securing between the welding apparatus and the conduit 17 is obtained.

The conduit 17 is a hollow flexible tube which carries in spaced relationship the electrical supply cable 18 which has a bellows shaped configuration that connects at junction 21 onto the first sliding sleeve 11 for electrical conduction. The slidably positioned sleeve 11 is further provided with electrically connected a combination non-conducting and conducting member 15 that is slidably positioned on the tube 10 for moving the sleeve 11 as well as for keeping the electrode 16 in a concentric position within tube 10.

Figure 2:
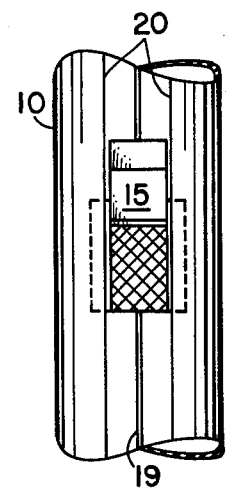
FIG. 2 is a partial side view of the welding apparatus shown in FIG. 1 taken along line 2 — 2.

As shown in the detailed side view in FIG. 2 the protruding member 15 or finger brake for manual operation of adjusting the electrode 16 has a guiding arrangement which is provided by the flanges 20 being an integral part of the tube 10. The open-to-the-air slot 19 allows for the movement of the member 15 or finger brake along the lengths of the tube as well as provides added air intake to cool the tube 10.

Assuming that the conduit 17 is connected in a console which provides a suction force, the welding apparatus during operation will experience an electrical charge from point A on the electrode 16 which electric energy is released into a workpiece (not shown). The smoke, contamination, heat and gases will all form a complete blanket around the operation. However, by the use of the present invention this is removed immediately through the tube 10 and conduit 17 towards the console of the welding system. The traveling smog and gases combined with air will produce a cooling effect through the spring 13.

The spring 13 thus provides for a force for moving the electrodes in a required position so that actuation of the finger brake 15 and the spring 13 forms an interconnecting channel between the electrode and the electrical conduits. Also, the spring 13 serves as a heat sink for the accumulating fluids such as smog, smoke, etc. which later must pass along and through the spring configuration by the air pressure differential. This action then results in drawing a cleaner environment about the weld, thus promoting the effervescence condition of the molten weld deposit.

During operation the electrode 16 melts at the point A and the arc will shorten the electrode original length so that by proper adjustment through the operation of the operator by moving the finger brake 15 the distance can be maintained at about 1½ inch, this distance being proven through tests to be the most efficient and effective position for suction of the smog that is caused during welding. In addition, as the suction force is increased, the length of the electrode protruding from tube 10 is also increased.

Figure 3:
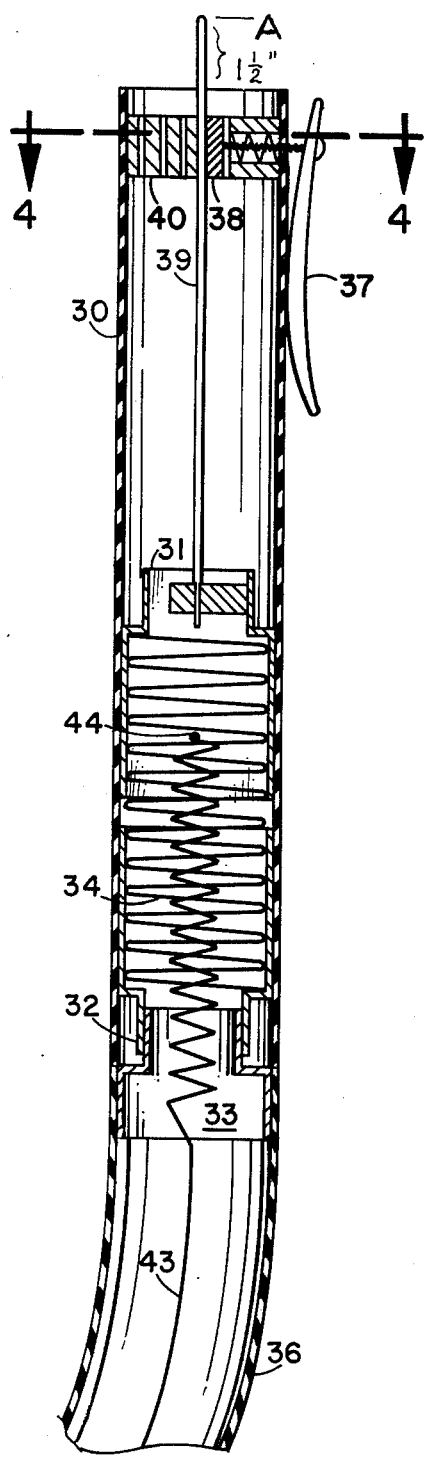
FIG. 3 is a longitudinal cross-section of a welding apparatus according to the second embodiment of the present invention.

Referring now to FIG. 3 there is shown an elongated cross-sectional view of a second perferred embodiment of the present invention which comprises a tube 30 or electrical conductive reciprocating electrode holder tube 30 which contains a sleeve 31 or first electrical conductive sliding sleeve 31 and an electrode 39. A second but stationary mounted sleeve 32 provides for a spring retainer means for holding the spring 34 between the sleeve 32 and 31 respectively. The conduit 36 which is of a flexible material is provided with a sleeve 33 which mates with the stationary sleeve 32 in the tube 30 for proper securing with the electrode 39 welding apparatus. The electrode 39 is positioned concentrically within the tube 30 by the sleeve 31 and guided through a combination filter and support bridge 40 which is mounted within the tube 30. An electrical supply cable 43 is concentrically positioned within the flexible supply conduit 36 and provided with a bellows-shaped configuration terminating in a junction 44 for conducting electricity via the supply cable 43 onto the sleeve 31. The combination air filter and support bridge 40 is provided with a plurality of holes 45. When viewing the cross-section in FIG. 4, it will be noticed that a resiliently mounted handle 37 having a curved configuration for pivoting about the tube 30 will produce a releasing force to the brake shoe 33 which confines the electrode 39 in the center of the filter 40. The resilient action of the handle 37 is provided by a spring 41 which can be adjusted by the threaded member interconnecting the lever 37 with the brake shoe 38.

Figure 5:
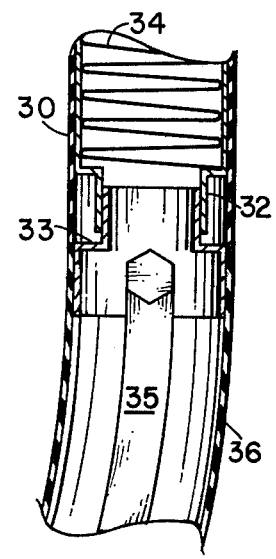
FIG. 5 is a longitudinal cross-section showing another form of interconnection between the conduit and the welding apparatus.

In FIG. 5 there is shown a different construction of connecting the electrical supply cable 35 to the sleeve 33 which connects onto sleeve 32 so that the electrical energy is delivered from the supply cable 35 via the sleeves towards sleeve 31 to the electrode 39.

Figure 4:
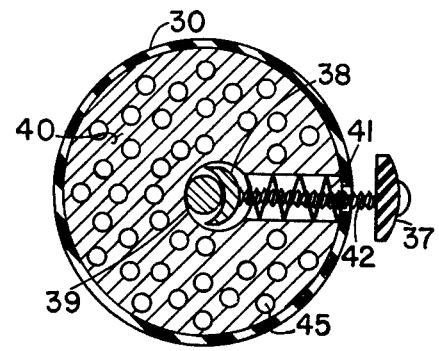
FIG. 4 is a cross-section taken from FIG. 3 along line 4 — 4.

The operation of the apparatus as shown in FIGS. 3, 4, and 5, inclusive of the handling procedure of the welding apparatus is as follows. An electrode 39 is concentrically placed and held within the holder tube 30 until the electrode 39 penetrates and is stopped within the first sliding sleeve 31. With continued physical pressure directed downwards on the electrode 39 the sleeve 31 pushes the compression spring 34 downwards so as to nearly rest upon the first electrical conductive stationary spring tensioner and aligner sleeve 32. Together in unison the electrode 39, sleeve 31, and the spring 34 will change their positions and dimensions temporarily within tube 30. At random the operator will choose the exact time to release the electrode 39 by way of the brake shoe release lever 37. This lever 37 is geared about and within the band so as to move the lever 37 downwards as upon a fulcrum. This action forces the brake shoe fixation screw 42 to pull away under tension of the brake shoe spring 41 from the connected brake shoe 38. The outcome of the cycle allows the free moving electrode 39 to pass upwards between the brake shoe 38 and the combination air filter and support bridge 40. Again, the mere releasing of the lever 37 would put the shoe 38 upon the electrode 39 to maintain it motionless. The exact time of manipulation of the lever 37 is relatively important because at point A electrode 39 melts thereby shortening the electrode 39 from its original length and thus upon proper operation the distance of the arc as described for FIG. 1 can be maintained while welding.

Figure 6:
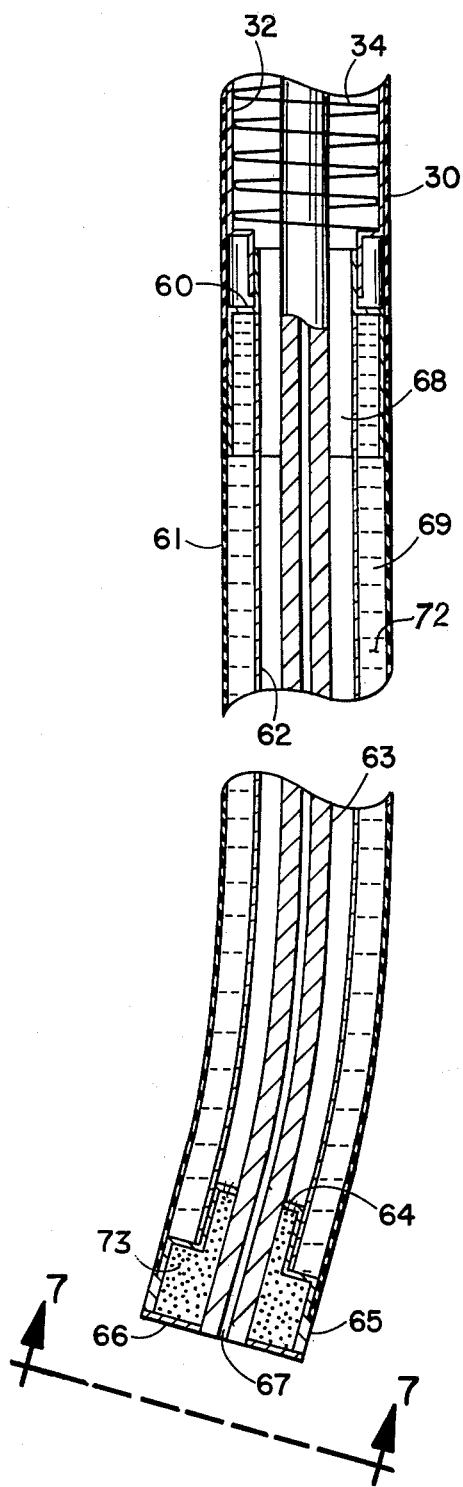
FIG. 6 is a longitudinal cross-section of a multiple energy supply conduit being third embodiment of the present invention.

FIG. 6 illustrates a longitudinal cross-section of a multiple energy supply conduit having a sleeve 60 which mates with sleeve 32 of the welding tube 30.

A flexible conduit 61 having a concentrically spacedly positioned inner conduit 62 is mounted between the sleeve 60 and a sleeve 66 which latter sleeve 66 forms the connector plug designed to fit a welding console (not shown). The space or channel 69 formed by the conduits 60 and 61 confines an electrically conductive fluid such as mercury 72. The inside area 68 of the conduit 62 forms a channel for the passage of smoke or the like towards sleeve 66. The conduit or hose 63 is of a metallic braided material and is connected onto a hollow electrode positioned in the welding apparatus as shown in the prior figures. The hose 62 has an open channel 67 which serves to transfer air, molten metal, chemicals or an inert gas. Because of the fact that some molten metals, such as steel, will not cohesively cling to copper and aluminum, the hose 63 is preferably constructed from one of those materials to enhance the removal and transfer of molten metals. Of course, the hose 63 can also be used as a secondary electrical conductor to the electrode.

It can be seen and inferred from these illustrations that various electrical and fluid passage combinations can be employed here.

In addition, it should be noted that mercury becomes excellent heat dissipators during the welding operation.

The connector plug or sleeve 66 as illustrated, contains a chamber filled with a filtering material such as activated carbon 73 or the like. The filtering action can also be taken care of in the console itself. However, assuming that the present configuration exists, the smog travels via the opening 64 in sleeve 66, the filtering material 73 and holes 71 into the console for further purification or disposal.

Figure 7:
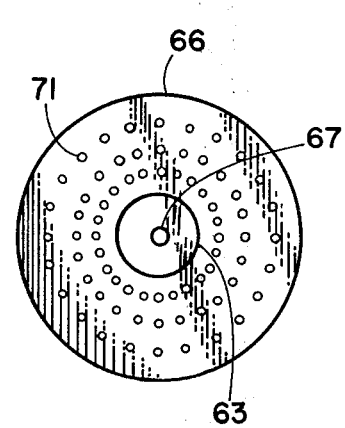
FIG. 7 is a bottom view taken from FIG. 6 along line 7 — 7.

The fourth embodiment of the present invention is the longitudinal cross-section of a welding apparatus shown in FIG. 8. The welding apparatus is connected with the multiple energy supply conduit 61 and mounted to the apparatus by screw 96. The multiple energy supply conduit 61 as featured here in FIG. 8 has been explained in FIGS. 6 and 7. Its utility now shows a pressurized airstream 67 as contained within conduit 94 and attached by a compression force about the hollowed electrical conductive shaft 85. This airstream 67 is continually pushing against the electrical conductive cylinder 86 which contains the metallic portion 100 of the electrode 88. This pressurized air enters through the small conduit 87 which is placed immediately behind the electrical conductive cylinder 86 to prevent its falling into the larger conduit 94. The cylindrical conductor 86 will move towards the arc when the operator actuates simultaneously the components of the hollowed hand grip which includes the return spring 82, welding apparatus main support 80, actuator 81 as connected to its movable catch 83. It should be noted that during the actual melting of the electrode the smog thus produced is instantly sucked through the transparent hood structure 91 which contains the filtration holes 102 as shown in FIG. 9, From here this same smog will continue its journey towards the air suction source entering main welding apparatus channel 93, stationary sleeve 92, the combination filter-electrical conductive stabilizer and positioner 101, sleeve 60, air flow channel 68 and the welder's console (not shown).

The notches 99 upon the cylinder 86 as well as the notches 98 upon the electrode 88 act as a grip for braking the movement of the cylinder 86 or electrode 88 by way of the two catches 83 and 84, respectively. Also, catch 84 assures at all times the exact position of the electrode 88, when catch 83 is once again activated to move forward the cylinder 86 containing the portion 100 of the electrode 88, as the electrode 88 is being consumed. When all of the electrode 88 is consumed, it will be difficult to insert a new electrode 88 into the cut-a-way portion of the conduit 85 as the two catches 83 and 84 protrude within conduit 85. This is immediately remedied by the operator when he rotates 90° the attached fixation nut 89. This nut 89 is fastened to conduit 85 by set screw 90 and the rotation of the conduit 85 along its longitudinal axis will rotate conduit 86 on which 83 and 84 protrude and force 83 and 84 inwards. After electrode 88 is inserted into cylinder 86, the operator reverses the rotation 90° so that the catches 83 and 84 interlock, with grooves 98 to once again repeat the welding operation. It is possible to allow conduit 94 to be filled with an electrical conductive substance the same as liquid 69 when used in transferring the electrical energy from the power console (not shown) to conduit 85, thereby transferring it immediately to the cylinder 86 which contains the portion 100 of the electrode 88. When making this change, one would have to make water-tight the orifice 87, not relying upon the air pressure to move the electrode 88 forwards, catch 83 would push forward the combined cylinder 86 and its electrode 100 by way of notches 98 and 99. Catch 84 would still act as a brake and positioner. When not directly allowing a continual air supply force from welder's console (not shown) to enter into conduit 94 so as to move the cylinder 86 forward a small hole fitted and sealed with a flexible conduit (not shown) is made immediately adjacent and protruding into conduit 87 still continuing through sleeve 92 out through the side of channel 93 to where is it connected to a hand size air bulb which acts also as an integral part of the handle grip (not shown). Then at random the bulb (not shown) is squeezed allowing a force of air pressure to push cylinder 86 forwards as before.

With all of the air pressure techniques of pushing cylinder 86 forwards explained herein it was found advantageous to apply a magnetic grease about cylinder 86 and within conduit 85. This application will not only assure against arc-across of cylinder 86 rubbing against conduit 85 when electrically charged but will lubricate as well as seal in the needed air, holding up the cylinder 86 containing the electrode 100. Thus, no unnecessary activation of the air bulb (not shown) takes place. Also, when this method of operation is used it will be necessary to insert a small conduit of approximately ¼ inch long (not shown) near the top of the larger conduit 85, allowing an electrode to be inserted (the un-notched variety, not shown) through it but not allowing cylinder 86 to fall out of its electrically conductive container 85. When the air suction pressure continues to remove the smog and follows towards the route elaborated upon in an above reference, it is possible to remove plug 97 and insert another flexible conduit (not shown) when attached to a welder's helmet or glove (not shown). The suction action moving through the electrode holder 93 would force any residual smoke taken into the helmet or glove by accident and combine it along with the other smog entering the filtration process at the console. If for nothing else, the movement of air from within the glove or helmet will give added comfort to the welder as the air pressure differential lowers the temperature therein. When not attached to anything else, the orifice containing the plug 97 can be partially opened to allow any excess pressure to be corrected near hood 91. This procedure would not necessitate the finer tuning of air flow pressures at the console. FIG. 9 is a cross-section taken from FIG. 8 along 9 — 9 and clearly illustrates the exact spaced relationship of some of the concentrically located parts thereof. FIG. 10 is a cross-section taken from FIG. 8 along lines 10 — 10 again illustrating the exact spaced relationship of the component parts thereof.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Now, therefore, I claim:

1. A welding device for use with a welding console, said welding device comprising,
    a conduit having an inner end for communication with a welding console and an outer end,
    a slidable electrically conductive sleeve member concentrically and abuttingly positioned in said conduit and having open ends to provide free air flow therethrough,
    an electrode in said conduit in spaced relationship with said conduit, extending from said slidable sleeve member out said outer end of said conduit, attached to said sleeve member, and being movable with said slidable sleeve member,
    a stationary sleeve member concentrically and abuttingly positioned in said conduit nearer the inner end thereof than is said slidable sleeve member, likewise having open ends to provide free air flow therethrough,
    means extending from said stationary sleeve member to said slidable sleeve member to yieldably urge said slidable sleeve member and said electrode toward said outer end of said conduit, and
    an electrical conduction means within said conduit to convey electrical energy from said console to said electrode.

2. The welding device of claim 1 wherein said conduit includes a brake means attached to said slidable sleeve member to adjust the position of said slidable sleeve member and said electrode and control the amount thereof extending out said outer end of said conduit.

3. The welding device of claim 2 wherein said conduit has a longitudinally extending slot therein to provide capability of air intake, and said brake means extends through said slot to adjust the position of said sleeve member and said electrode.

4. The welding device of claim 3 wherein suction means is provided at the inner end of said conduit to move welding smog, foul smoke and other gases away from said outer end of said conduit toward said inner end of said conduit, and to move cooling air into said conduit through said slot.

5. The device of claim 5 wherein said means to yieldably urge said slidable sleeve member and said electrode toward said outer welding end of said conduit is a spring means.

6. The device of claim 5 wherein said spring is thermally conductive for heat exchange with hot welding smog, foul smoke and other gases contacting said spring.

7. The welding device of claim 2 wherein said brake means is a brake shoe having means to yieldably urge said brake shoe against said electrode but movable away therefrom to allow said means extending from said stationary sleeve to said slidable sleeve to move said slidable sleeve and said electrode toward said outer end of said conduit.

8. The welding device of claim 7 which includes an air filter positioned concentrically and abuttingly within said conduit, near the outer end thereof said air filter having a centrally located aperture and said electrode extends therethrough.

9. The device of claim 1 wherein said slidable sleeve member is electrically conductive and said electrical conduction means is electrically connected thereto.

10. The device of claim 1 wherein said conduit has a plurality of channels, each in fluid communication between the outer end of said conduit and the inner end of said conduit, with each channel being free from communication with other of said channels.

11. The device of claim 10 wherein a plug of filtering material is positioned concentrically and abuttingly in said conduit near the inner end of said conduit, said filtering material being in communication with each of said channels.

12. A welding device for use with a welding console, said console having means for generating air pressure, said device comprising,
    a first conduit having an inner end for communication with a welding console and an outer end, an electrode receiving conduit concentrically positioned within said first conduit, also having an inner end for communication with a welding console and an outer end, an electroconductive air cylinder longitudinally movably and concentrically positioned in said electrode receiving conduit, near said inner end of said electrode receiving conduit, an air stream channel extending from said air pressure generating means of said console to the bottom of said air cylinder, said air cylinder being responsive to air pressure entering the console communicating end of said electrode receiving conduit and passing through said channel to the bottom of said air cylinder to create a yieldable force caused by pushing said air cylinder against said electrode in the direction of said outer end of said electrode receiving conduit;

an electrode in said electrode receiving conduit forward of said air cylinder and longitudinally movable towards said outer end of said conduit in response to pressue from said air cylinder, and a brake means mounted on said device to contact and hold said electrode in a stationary position, said brake having a brake release which upon release allows said electrode to be moved forwardly toward said outer welding end of said electrode receiving conduit.

13. A welding device for use with a welding console, said welding device comprising, a welding conduit having an inner end for communication with a welding console and an outer end, a slidable electrically conductive sleeve member concentrically and abuttingly positioned in said conduit, and having open ends to provide free air flow therethrough positioned in said conduit, an electrode positioned concentrically and in spaced apart relationship, in said conduit attached to said sleeve member, and extending from said slidable sleeve member out said outer welding end and being movable with said slidable sleeve member, and an electrical conduction means within said conduit electrically connected to said sleeve member for electrical connection to a welding console to convey electrical energy from said console to said sleeve member and said electrode.

14. A welding device for use with a welding console, said welding device comprising, an eletrically conductive conduit having an inner end for communication with a welding console and an outer end, a stationary electrically conductive sleeve member concentrically positioned in said conduit and in electrical communication therewith, and having open ends to provide free airflow therethrough and an electrode positioned in said conduit, concentrically and in spaced apart relationship, attached to said sleeve member, and extending from said stationary sleeve member out said outer welding end, said electrode being in electrical communication with said stationary sleeve member and said console.

* * * * *

UNITED STATES PATENT OFFICE
CERTIFICATE OF CORRECTION

Patent No. 3,911,242        Dated October 7, 1975

Inventor(s) Virgil G. Strang

It is certified that error appears in the above-identified patent and that said Letters Patent are hereby corrected as shown below:

In Figure 1, that portion of element 15 inwardly of the inner surface of element 10 should be hatched as electrically conductive metal.

In Figures 3, 4 and 5, element 30 should be hatched as electrically metal.

In Figure 6, element 30 should be hatched as electrically conductive metal. Element 62 should be hatched as an electrical insulator.

In Figure 8, element 62 should be hatched as an electrical insulator.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 3,911,242           Dated October 7, 1975

Inventor(s)  Virgil G. Strang

It is certified that error appears in the above-identified patent and that said Letters Patent are hereby corrected as shown below:

Column 8, line 30, the second "5" should read -- 1 --.

Signed and Sealed this

Thirteenth Day of June 1978

[SEAL]

Attest:

RUTH C. MASON
*Attesting Officer*

DONALD W. BANNER
*Commissioner of Patents and Trademarks*